United States Patent
Capetta et al.

[11] Patent Number: 6,105,270
[45] Date of Patent: Aug. 22, 2000

[54] DEVICE FOR POSITIONING BAKERY PRODUCTS IN TINS OR SIMILAR

[75] Inventors: Daniele Capetta; Antonio Chierici; Enrico Schiaretti, all of Parma, Italy

[73] Assignee: Barilla Alimentare S.p.A., Parma, Italy

[21] Appl. No.: 09/080,410

[22] Filed: May 18, 1998

[30] Foreign Application Priority Data

May 20, 1997 [IT] Italy .................. MI97A1176

[51] Int. Cl.⁷ .................. B65G 47/24
[52] U.S. Cl. .................. 33/645; 33/1 F; 198/387; 198/418.6
[58] Field of Search .................. 33/645, 613, 520, 33/533, 1 F; 198/383, 387, 418.6; 414/793.4, 794.2

[56] References Cited

U.S. PATENT DOCUMENTS

| | | |
|---|---|---|
| 2,472,073 | 6/1949 | Haecks . |
| 2,847,809 | 8/1958 | Lindeman et al. .................. 198/418.6 |
| 3,011,620 | 12/1961 | Amori .................. 198/387 |
| 3,258,105 | 6/1966 | Willsey et al. .................. 198/383 |
| 3,527,173 | 9/1970 | Mullvain, Sr. et al. . |
| 3,715,024 | 2/1973 | Mumma .................. 198/387 |
| 3,794,161 | 2/1974 | Peterson .................. 198/387 |
| 3,894,631 | 7/1975 | Rose et al. .................. 198/418.6 |
| 4,019,621 | 4/1977 | Hanson . |
| 4,766,990 | 8/1988 | Colombo .................. 198/383 |
| 4,872,564 | 10/1989 | Van Der Schoot .................. 198/387 |

FOREIGN PATENT DOCUMENTS 1 155 736 9/1961 Germany .

*Primary Examiner*—Andrew H. Hirshfeld
*Attorney, Agent, or Firm*—Nixon & Vanderhye P.C.

[57] ABSTRACT

A device is provided for positioning single bakery products, supplied by dropping, in recesses of a tin. At least one centering recess is disposed above the tin, which is formed by bringing together two facing half-shells. Structure for moving the half-shells away from each other synchronizes the drop of the bakery products with the advancing tin. Excess bakery products can be expelled from the centering recess into adjacent centering recesses, with the centering recesses forming an alignment corresponding to the at least one row of receiving recesses.

15 Claims, 3 Drawing Sheets

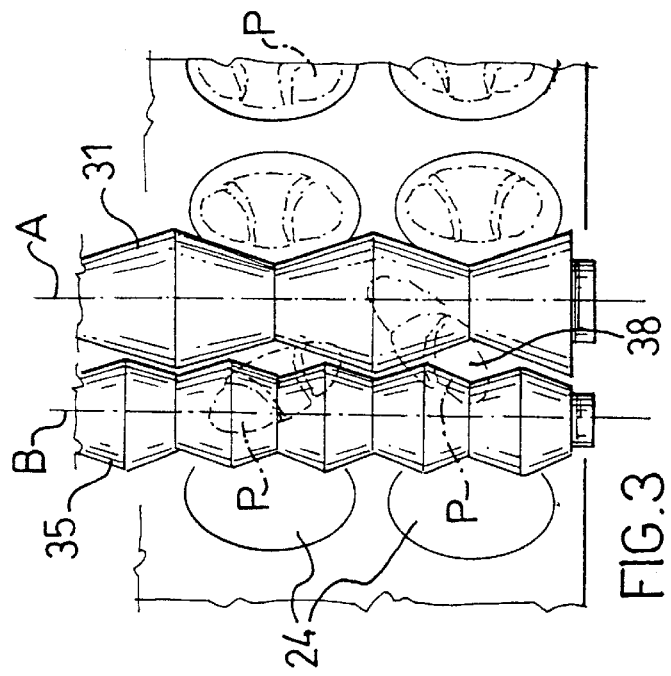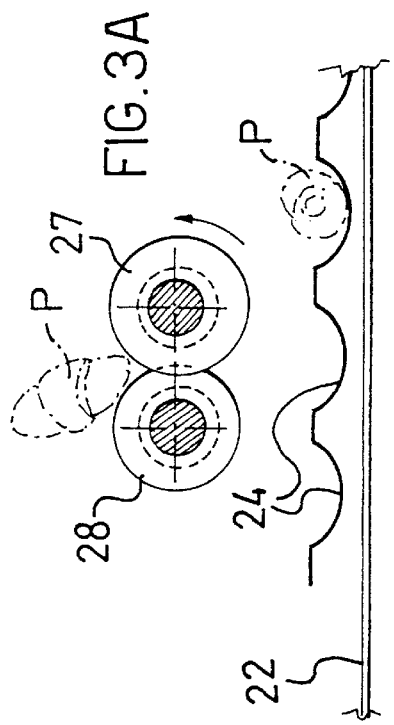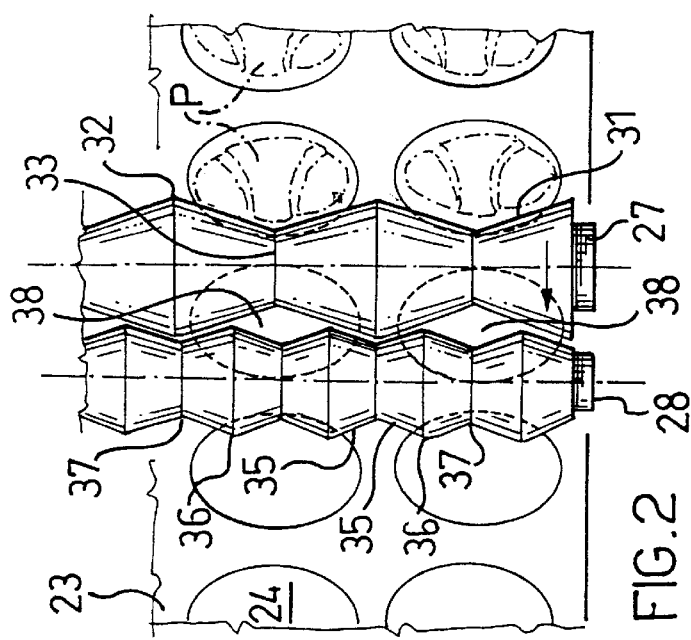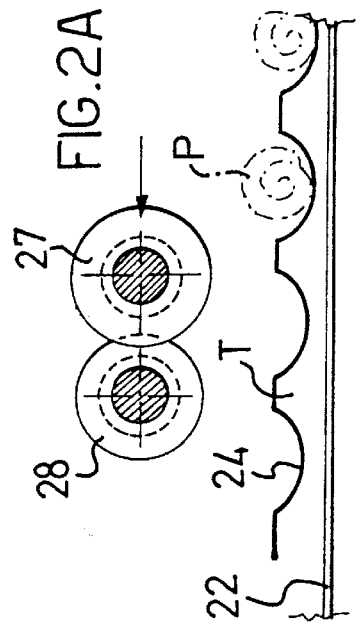

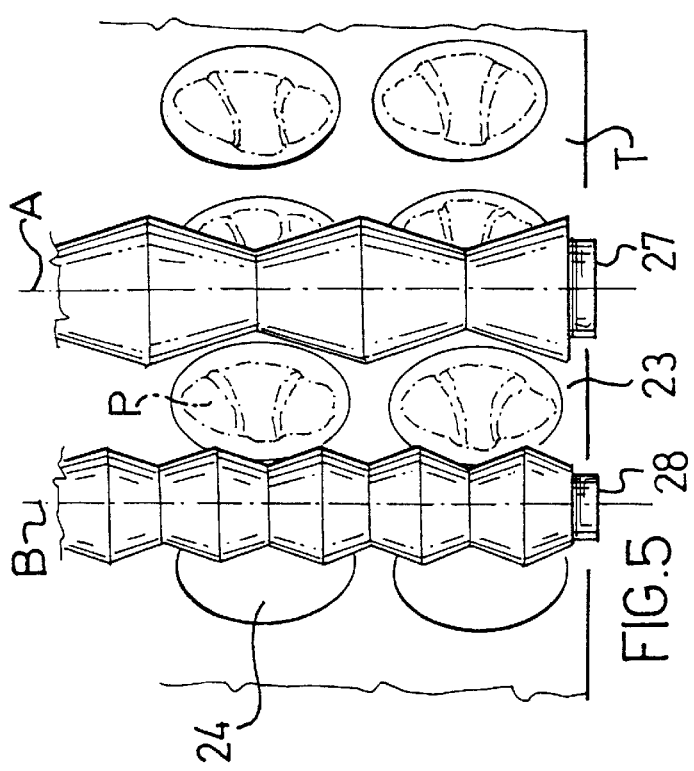
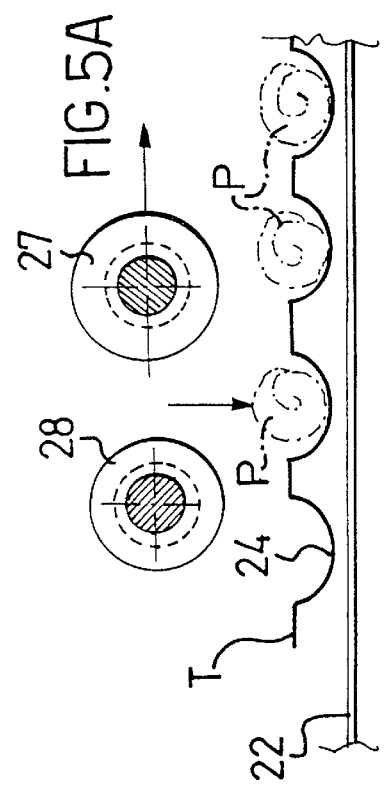
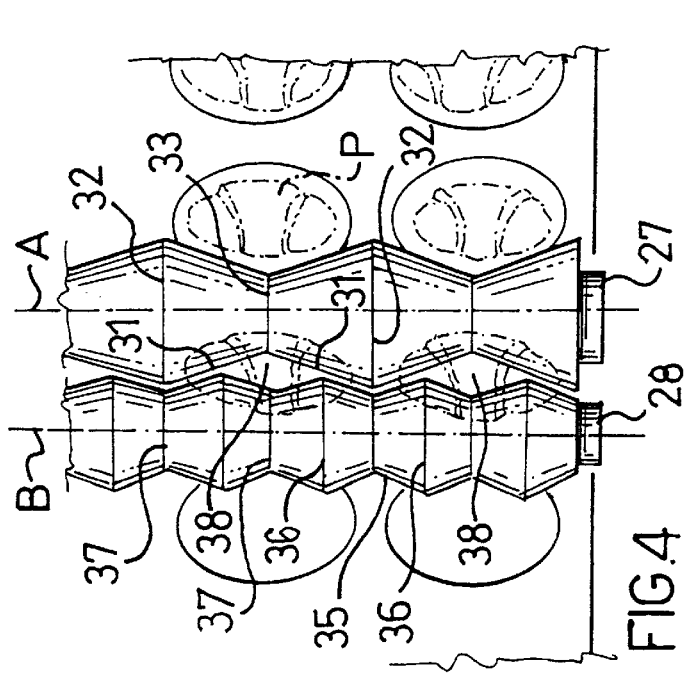
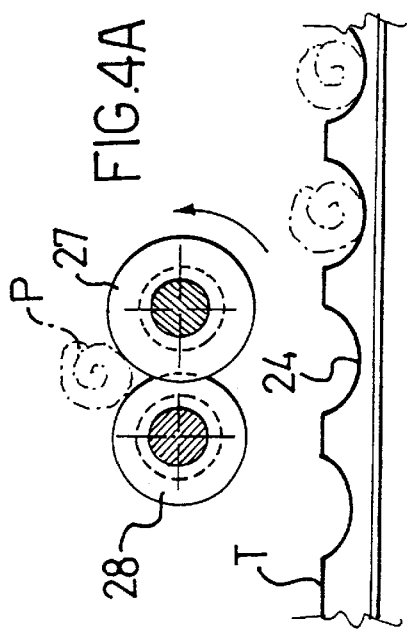

DEVICE FOR POSITIONING BAKERY PRODUCTS IN TINS OR SIMILAR

FIELD OF THE INVENTION

The present invention relates to a device for positioning bakery products, supplied by dropping in a bakery production line, in tins or similar, having a plurality of receiving recesses disposed in aligned rows, each recess being designed to receive a single bakery product.

BACKGROUND OF THE INVENTION

An acknowledged need in the management of bakery production lines of the automated type is to reduce the wastage of products which, for one or another reason, are unable to reach the end of the line.

One of the most common causes of wastage consists in the removal of those bakery products which, as a result of their irregular shape, are not automatically positioned in the recesses, for example the baking recesses of the baking tins, for which they are intended.

This is because bakery products are very commonly supplied by dropping, after which it is possible that they will not be located exactly in the required position.

SUMMARY OF THE INVENTION

The technical problem underlying the present invention is that of providing a device, which meets the aforesaid requirement, for positioning the bakery products, supplied by dropping, in the corresponding receiving recesses.

This problem is resolved by a device as specified, which includes, next to each receiving recess of at least one of the rows, at least one centring recess disposed above the tin, the centring recess being formed by bringing together two facing half-shells; structure of moving the half-shells away from each other, to synchronize the dropping of the bakery products with the advancing tin; and structure of expelling excess bakery products from the centring recess into adjacent centring recesses.

The at least one centring recess forms an alignment corresponding to the at least one row of receiving recesses.

The principal advantage of the device according to the invention consists in the fact that, with optimal efficiency, each receiving recess is made to receive a single bakery product, thus avoiding the requirement to remove any excess bakery products.

BRIEF DESCRIPTION OF THE DRAWINGS

Further characteristics and advantages of the device according to the invention will be made clear by the description of a preferred embodiment thereof, provided for information and without restriction, with reference to the attached drawings in which:

FIGS. 2, 3, 4, and 5 are partial plan views of the device shown in FIG. 1 and illustrate various phases of its operation; and FIG. 2A, 3A, 4A, and 5A are side views of the device shown in FIG. 1, corresponding to each of FIGS. 2, 3, 4, and 5 respectively.

DETAILED DESCRIPTION OF THE INVENTION

Figure 1:
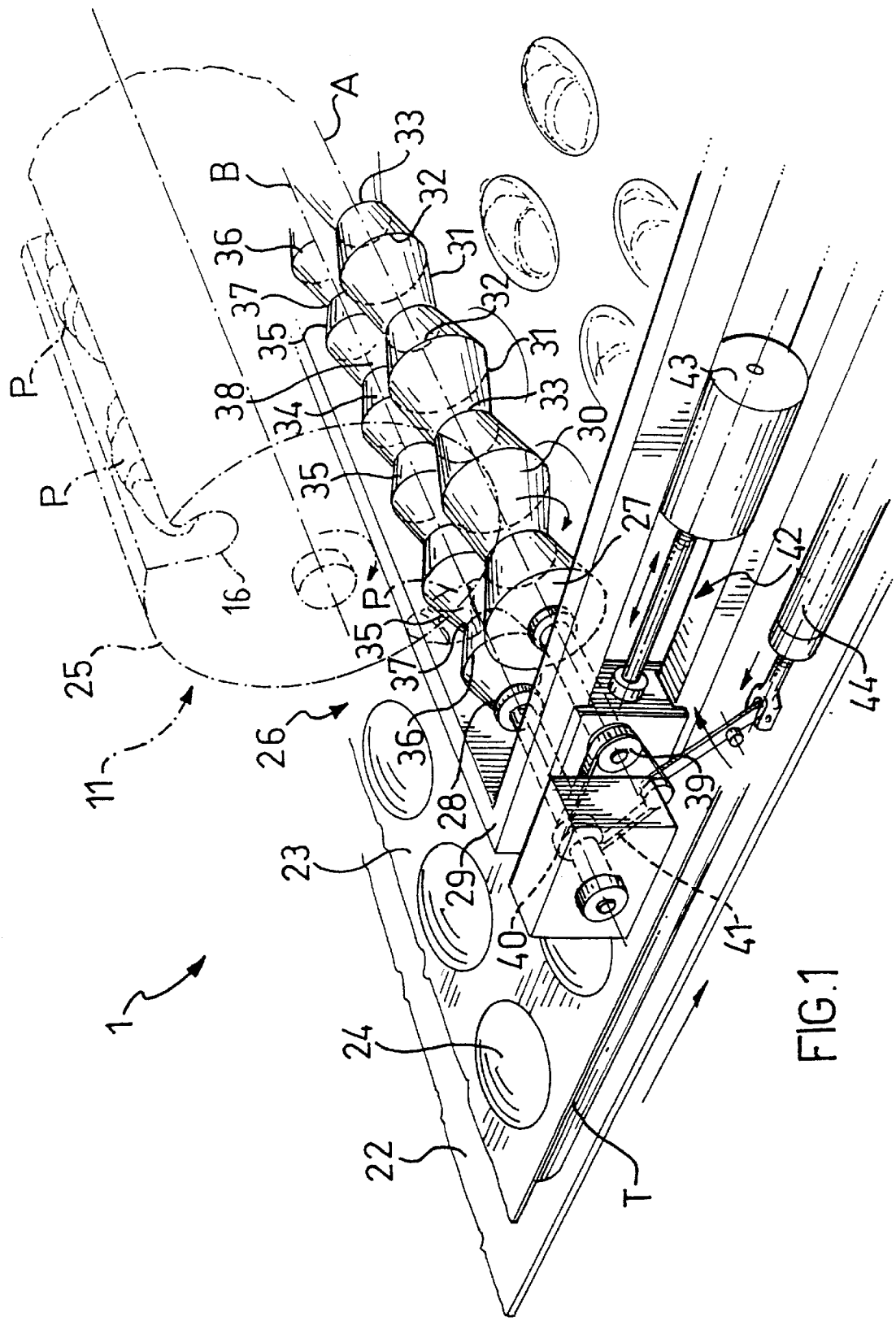
FIG. 1 is a perspective view in partial section of a station for positioning bakery products in a baking tin, which incorporates the device according to the invention.

In FIG. 1, a positioning station for bakery products P is indicated in a general way by the number 1, and is disposed next to a conveyor belt 22 which carries a tin T which is designed to enter an oven for baking the products P and which has aligned rows 23 of receiving recesses 24, which are in particular baking recesses, disposed at equal intervals in each of the rows 23.

The bakery products are supplied by dropping from a preceding station, for example a forming station, by suitable feed means 25, which in the present embodiment comprise a cylinder 25 having channels 16 which receive an alignment of bakery products P in a quantity which completely fills one row 23 of the tin T.

The tin T is movable by advancing on the conveyor belt 22 in synchronization with the drop of the bakery products. The advance may be made to take place either stepwise or continuously.

Between the feed means 11 and the tin T, the positioning station 1 comprises a device, indicated generally by the number 26, for positioning the bakery products P in the tin T.

The device 26 comprises a first shaft 27 and a second shaft 28, having axes A and B respectively parallel to the tin T and to its rows 23, the shafts being disposed adjacent to each other in a position above the tin T and at a short distance from it.

The shafts 27, 28 extend across the whole width of the tin, and are supported by a suitable frame 29.

The first shaft 27 comprises a first outer rotating surface 30 which has a succession of truncated conical surfaces 31 joined alternately at their major bases 32 and their minor bases 33. The truncated conical surfaces 31 joined by any of the minor bases 33 form substantially a half-shell.

The truncated conical surfaces 31 of the first shaft 27 are characterized by an identical predetermined first frustum height and by an identical predetermined first angular aperture; in other words, the truncated conical surfaces 31 of the shaft 27 are all geometrically identical to each other and those joined by a single major base 32 are mirror images of each other, as are those joined by a single minor base 33.

The second shaft 28 also comprises a second outer rotating surface 34 which has a succession of truncated conical surfaces 35 joined alternately at the corresponding major bases 36 and minor bases 37.

The truncated conical surfaces 35 of the second shaft 28 are characterized by an identical predetermined second frustum height and by an identical predetermined second angular aperture; in other words, the truncated conical surfaces 35 of the shaft 28 are all geometrically identical to each other and those joined by a single major base 36 are mirror images of each other, as are those joined by a single minor base 37.

In the present embodiment, the truncated conical surfaces 31, 35 have the same angular aperture; in other words, the first and second angular apertures are identical.

Additionally, the second frustum height is equal to half of, or in any case is smaller than, the first cone height, so that the shafts 27, 28 have outer surfaces, belonging to the corresponding truncated conical surfaces 31, 35, whose inclinations match each other. Similarly, the shafts 27, 28 have outer surfaces, belonging to the corresponding truncated conical surfaces 31, 35, whose inclinations are different from each other.

The matching and different surfaces are arranged alternately so that, for each half-shell of the first shaft 27 identified by each of its minor bases 33, the second shaft 28 has a corresponding half-shell identified by one of its minor bases 37.

Owing to the geometry and positioning of the shafts 27, 28, the adjacent facing half-shells form a centring recess 38 for each of the baking recesses 24 of a given row 23 of the tin T, each centring recess therefore being formed by bringing together the half-shells.

The centring recesses 38 form an alignment corresponding, in practice, to a row 23 of baking recesses 24 lying beneath them.

Advantageously, in the present embodiment and as a result of the geometrical relationship between the heights of the truncated conical surfaces 31, 35, each minor base 33 and each major base 32 of the first shaft 27 corresponds to a minor base 37 of the second shaft 28.

Consequently, for each minor base 33 of the first shaft 27 there is a corresponding half-shell on the first shaft 27 and a half-shell on the second shaft 28 formed by truncated conical surfaces 35 of the second shaft 28 joined at the minor base 37 of the second shaft 28 corresponding to each minor base 33 of the first shaft 27 and having different inclinations with respect to the truncated conical surfaces 31 of the first shaft 27 joined at each minor base 33. The facing half-shells thus form a centring recess 38.

The device 26 also comprises means of expelling excess bakery products from a centring recess 38 to the adjacent centring recesses 38.

The expulsion means, in the present embodiment, generally consist of the previously mentioned truncated conical surfaces 35 that extend from a minor base 37 that is aligned with a major base 32 of the first shaft 27.

More precisely, the expulsion means relating to one of the minor bases 33 of the first shaft 27, identifying, as has been stated, each centring recess 38, comprise the truncated conical surfaces 35 of the second shaft 28 joined to the minor base 37 of the second shaft 28 corresponding to each major base 32 of the first shaft 27.

In the present embodiment of the device 26 according to the invention, the shafts 27, 28 rotate in the same angular direction. One of the said shafts 27, 28 is driven so that it rotates. On a corresponding end, each of the first and second shafts 27, 28 has a pulley, indicated by 39 and 40 respectively.

The pulleys 39, 40 are connected by a transmission belt 41 which transfers the rotation from the driven shaft to the other shaft which is thus made to rotate.

The device 26 also comprises means 42 for moving the facing half-shells away from each other, designed to synchronize the opening of the centring recesses 38 and the dropping of the bakery products P with the tin T advancing on the conveyor belt 22.

The means 42 for moving away from each other comprise an actuator 43, of the piston and cylinder type, associated with at least one end of a moving shaft of the first and second shafts 27, 28 with respect to a corresponding fixed shaft of the first and second shafts 27, 28.

In the present embodiment, the moving shaft is the first shaft 27, while the fixed shaft is the second shaft 28.

The device 26 comprises, in interaction with the actuator 43, means 44 of tensioning the transmission belt 41, these means conventionally consisting of a further hydraulic piston and cylinder system, designed to keep the belt 41 at the correct tension at all times even during the movement apart of the shafts 27, 28, thus ensuring the continuing rotation of the shafts.

The operation of the device 26 in synchronization with the station 1 will be described below with reference to FIGS. 2 to 5 and 2A to 5A.

In FIGS. 2 and 2A, the shafts 27 and 28 are in the receiving position, and the centring recesses 38 are formed by bringing together the facing half-shells, the shafts 27 and 28 being in a position where they are close together.

A row 23 of empty baking recesses 24 of the tin T is disposed under the alignment of centring recesses 38.

In FIGS. 3 and 3A, the centring recesses 38 receive the baking products P from the feed means 11. The products P drop randomly into an irregular configuration and in some cases lie partially across the major bases 32 of the first shaft 27.

The particular disposition of the truncated conical surfaces 31, 35 described above, in interaction with the rotation imparted to the shafts 27, 28, causes a displacement of the bakery products which are expelled by the centring recesses which are not appropriate for them and fall, in predetermined disposition, between the corresponding half-shells (FIGS. 4, 4A).

At this point the means 42 of moving away from each other which separate the half-shells of the centring recesses 38, in other words the shafts 27, 28, come into operation, causing the bakery products P, which are now in positions extremely close to the corresponding baking recesses and thus cannot leave these positions (FIGS. 5, 5A), to be dropped.

In addition to the advantages mentioned above, the device described above allows a substantial decrease in the manual intervention required for the positioning and/or the removal of bakery products in irregular positions.

This device also has a simple structure, can be constructed economically and is easily adaptable to any automated production line for bakery products.

It is also to be understood that the invention described above is not limited to positioning in a baking tin but extends to the precise positioning according to any other requirement that may arise in such a production line.

A person skilled in the art may make, in order to meet further and contingent requirements, numerous further modifications and changes to the device for positioning bakery products in tins as described above, all such modifications and changes falling within the scope of protection of the present invention, as defined in the attached claims.

What is claimed is:

1. A device for positioning bakery products, supplied by dropping, in a tin with aligned rows of receiving recesses, each of the recesses designed to receive a single one of said bakery products, the device comprising:

first and second rotatable shafts, the first shaft having an outer rotatable surface with a succession of truncated conical surfaces joined together alternatively by major bases and minor bases, the second shaft having an outer rotatable surface with a succession of truncated conical surfaces joined together alternatively by major bases and minor bases, wherein each minor and major base of the first shaft is aligned with a corresponding one of the minor bases of the second shaft; and means for moving the shafts away from each other to synchronize the drop of said bakery products with the tin.

2. A device according to claim 1, in which said first and second shafts rotate in the same angular direction.

3. A device according to claim 2, wherein said first shaft truncated conical surfaces are identical to each other and have a predetermined first frustum height and a predetermined first angular aperture.

4. A device according to claim 2, wherein said second shaft truncated conical surfaces are identical to each other and have a predetermined second frustum height and a predetermined second angular aperture.

5. A device according to claim 3, wherein said second shaft truncated conical surfaces are identical to each other and have a predetermined second frustum height and a predetermined second angular aperture, and wherein said second frustum height is smaller than said first frustum height.

6. A device according to claim 5, in which:

said second frustum height is equal to half of the first frustum height.

7. A device according to claim 6, in which said first and second angular apertures are identical.

8. A device according to claim 6, in which said means for moving the first and second shafts away from each other comprise an actuator having a piston and a cylinder, said actuator connected to one of said first and second shafts for moving said one shaft towards and away from the other of said first and second shafts.

9. A device according to claim 1, wherein said first shaft truncated conical surfaces are identical to each other and have a predetermined first frustum height and a predetermined first angular aperture.

10. A device according to claim 9, wherein said second shaft truncated conical surfaces are identical to each other and have a predetermined second frustum height and a predetermined second angular aperture, and wherein said second frustum height is smaller than said first frustum height.

11. A device according to claim 10, in which:

said second frustum height is equal to half of the first frustum height.

12. A device according to claim 1, wherein said second shaft truncated conical surfaces are identical to each other and have a predetermined second frustum height and a predetermined second angular aperture.

13. A device according to claim 1, in which said truncated conical surfaces of each of the first and second shafts are geometrically identical, respectively.

14. A device according to claim 1, in which said means for moving the first and second shafts away from each other comprise an actuator having a piston and a cylinder, said actuator connected to one of said first and second shafts for moving said one shaft towards and away from the other of said first and second shafts.

15. A device for positioning bakery products to be dropped into a tin, the device comprising:

a first rotatable shaft having a first succession of substantially truncated conical surfaces; and a second rotatable shaft disposed adjacent the first rotatable shaft and having a second succession of substantially truncated conical surfaces, the first shaft having an outer rotatable surface with the first succession of truncated conical surfaces joined together alternatively by major bases and minor bases, the second shaft having an outer rotatable surface with the second succession of truncated conical surfaces joined together alternatively by major bases and minor bases, wherein each minor and major base of the first shaft is aligned with a corresponding one of the minor bases of the second shaft; and, wherein said first and second rotatable shafts are displaceable relative to each other, thereby enabling a synchronized drop of the bakery products.

* * * * *